Feb. 24, 1948.   C. E. NYBERG   2,436,664
BABY TENDER AND THE LIKE
Filed June 11, 1945   2 Sheets-Sheet 2
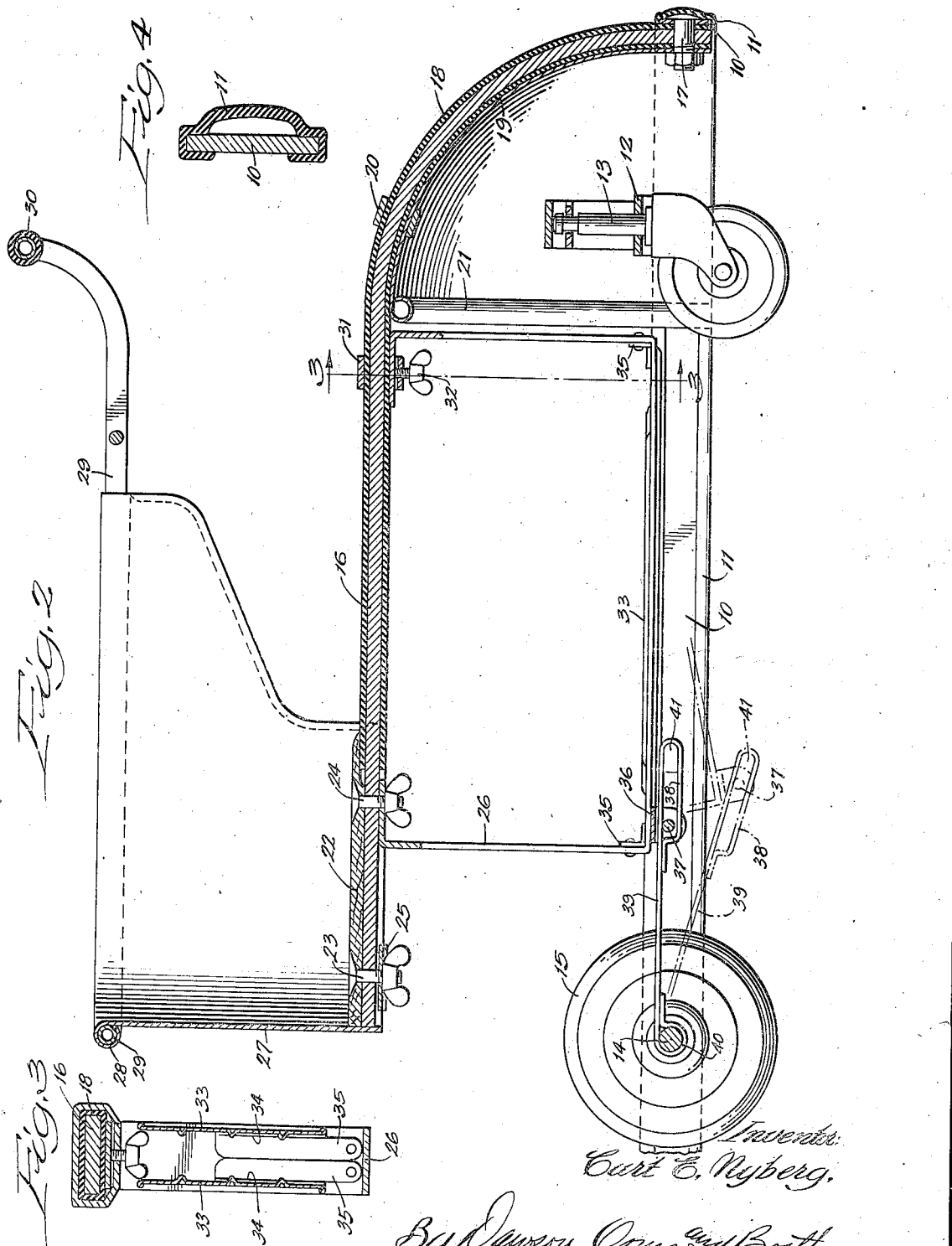
Inventor
Curt E. Nyberg.
By Dawson, Ooms and Booth,
Attorneys.

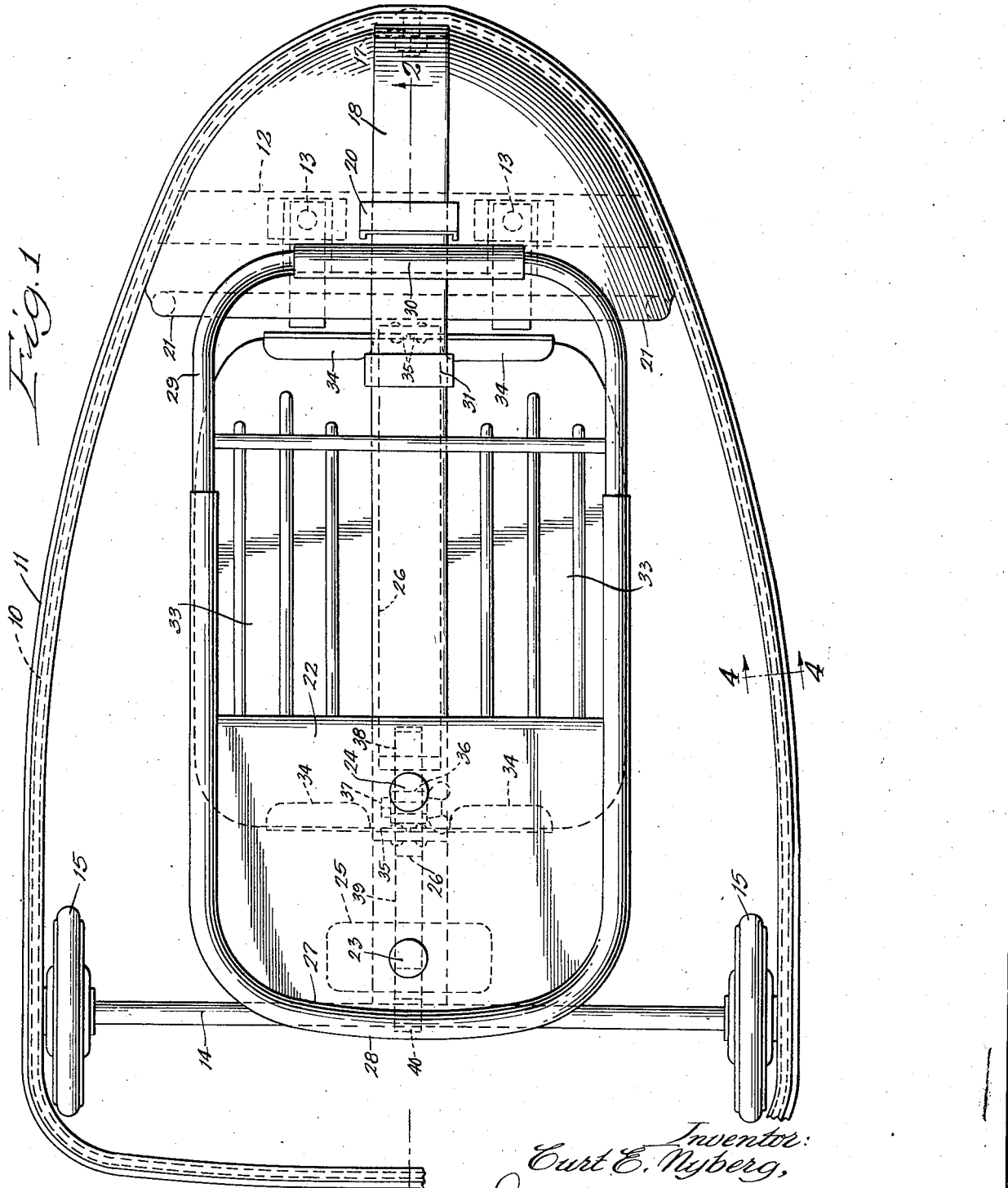

Patented Feb. 24, 1948

2,436,664

UNITED STATES PATENT OFFICE 2,436,664

BABY TENDER AND THE LIKE

Curt E. Nyberg, Chicago, Ill., assignor to
James F. Barnes, trustee

Application June 11, 1945, Serial No. 598,779

7 Claims. (Cl. 155—18)

1

This invention relates to a baby tender, but the invention is obviously applicable to other uses.

An object of the invention is to provide a new type of baby tender and the like, which is free from springs in the wheel mountings and which affords smoother riding qualities. A further object is to provide a baby tender structure of new design having a compact arrangement and in which parts may be readily knocked down and mounted in small space for shipping. Yet another object is to provide a structure in which a single spring is employed for supporting the seat and for sustaining foot rests, etc. Other specific objects and advantages will appear as the specification proceeds.

The invention is illustrated in a preferred embodiment, by the accompanying drawing, in which—

Figure 1 is a plan view of a structure embodying my invention; Fig. 2, a longitudinal sectional view, the section being taken as indicated at line 2 of Fig. 1; Fig. 3, a detail sectional view, the section being taken as indicated at line 3 of Fig. 2; and Fig. 4, a detail sectional view, the section being taken as indicated at line 4 of Fig. 1.

In the illustration given, 10 designates a main frame made of flat metal and preferably covered with a rubber molded strip 11 to prevent possible damage to furniture, etc. A yoke 12, having downwardly-turned end portions welded to the metal strip 10, extends across the front part of the frame and provides a mounting support for two caster wheels 13. The rear of the frame holds an axle 14 upon which the wheels 15 are mounted.

A spring member 16 is secured to the frame 10 at the front thereof by the rivet bolt means 17 illustrated. The spring is preferably covered with a rubber sheath 18, at least to the point where the seat (later described) is secured to the spring.

A hood 19 is secured to the frame and covers the front portion of the structure, the bolt means 17 being employed for securing the hood, as well as the spring 16, to the frame. The hood may carry a partial recess through the center in which the spring 16 rests to prevent side motion thereof. The same result is accomplished by the clip 20 which serves to hold the spring in a firm position upon the hood 19. The clip 20 extends through slots in the hood and aids in locking the hood upon the spring 16. The rear edge of the hood 19 is preferably rolled, as indicated at 21.

2

The hood, besides giving the carriage a streamlined appearance, covers the yoke and front caster mounting, and also provides a suitable rest for the cantilever spring 16.

The seat 22, which may be of wood or other suitable material, is fastened to the free end portion of the spring 16 by wing screws 23 and 24. Screw 23 extends through the washer 25, and screw 24 extends through a foot rest frame member 26. About the seat 22 is preferably secured a body enclosure member 27, which is preferably rolled at its upper end, as indicated at 28, and secures within the roll a tubular member 29. The member 29 is preferably covered with rubber tubing 30, or the like, at its forward portion.

The foot rest frame 26 is secured at one end by the wing bolt 24, as described, and at the other end by an oblong ring 31 through which a thumb screw 32 is threaded. Foot rests 33, as shown more clearly in Figs. 2 and 3, consist of metal webs secured to the flanges 34 formed integrally with and at right angles to the pivot bars 35. The bars 35 are pivoted to the vertical legs of the frame 26, as indicated best in Fig. 2. When the foot rests are folded into vertical position under the spring, the parts occupy the positions illustrated in Fig. 3.

In order to limit the swing of the cantilever spring 16 and to cushion the stopping of the swing, I provide snubber construction as follows: A bracket 36 is secured to the bottom leg of the frame 26 and supports a pin 37. Pin 37 is received within the loop 38 of the arm 39. The rear end of the arm is provided with a loop 40, which encloses the axle 14 about midway between the wheels. Within the loop 38 and at its forward end is a rubber pad 41 which engages the pin 37 to limit, with a cushioning effect, the swinging motion of the spring 16.

In the operation of the device, the spring member 16 yieldably supports the seat 22 so as to provide extremely smooth riding qualities. When the foot rests are in lowered position, the feet of the child are upon the rests and the carriage may be pushed along as a baby tender. If desired, handles for pushing the tender may be secured to the frame or body of the structure. When it is desired to use the structure as a walker, the foot rests are swung upwardly to the position shown in Fig. 3 beneath the spring 16, and the child is then able to stand upon the ground and move the carriage about.

The structure may be knocked down for shipment by very simple adjustments. Upon the release of the screws 23 and 24, the seat member 22 may be removed. Further, by releasing the thumb screw 32 and moving the oblong ring 31 rearwardly, the foot rest frame 26 is removable and may be shipped as a separate unit when the pin 37 is withdrawn from the loop 38. Further, the seat 22 may be reversed in position and mounted upon the spring by the same wing screws 23 and 24, for shipping in this very compact arrangement.

While in the foregoing specification, I have set forth specific details for the purpose of illustrating the invention, it will be understood that such details may be varied widely by those skilled in the art without departing from the spirit of my invention.

I claim:

1. In a baby tender, a wheel-equipped perimetric frame, a spring fixed at one end to said frame, a seat carried by the free end of said spring, means spaced from said frame for supporting said spring near its forward end portion, and means associated with the free end of said spring for limiting the swing thereof.

2. In a baby tender, a wheel-equipped perimetric frame, a spring having one end fixed to said frame, a seat carried by the free end of said spring, a frame fixed to and depending from said spring, foot rests foldably secured to said frame, and means cooperating with said frame for limiting the swing of said spring.

3. In a baby tender, a wheel-equipped perimetric frame, having a rear axle, a spring having one end fixed to the forward end of said frame, a seat carried by the free end of said spring, a foot rest frame fixed to and depending from said spring, and a lost motion connection between said frame and said rear axle permitting swinging of said spring but limiting the extent thereof.

4. In a baby tender, a wheel-equipped perimetric frame, having a rear axle, a spring having one end fixed to the forward end of said frame, a seat carried by the free end of said spring, a foot rest frame fixed to and depending from said spring, a lost motion connection between said frame and said rear axle permitting swinging of said spring but limiting the extent thereof, and cushioning means carried by said lost motion connection.

5. In a baby tender, a wheel-equipped perimetric frame, a spring fixed at one end to said frame, a hood fixed to said frame and supporting said spring at an elevated position above said frame, and a seat carried by the free end of said spring.

6. In a baby tender, a wheel-equipped perimetric frame, a spring fixed at one end to said frame, a hood fixed to said frame and supporting said spring at an elevated position above said frame, a seat carried by the free end of said spring, and means connecting said spring and said hood for limiting lateral movement of said spring.

7. In a baby tender, a perimetric frame, a spring fixed at one end to the front end of said frame, a yoke extending across the front end of said frame and having end portions secured to said frame, wheel means secured in said yoke, a hood enclosing said yoke and fixed to said frame, said hood being recessed longitudinally to receive said spring and providing a support for said spring at a point above said frame, and a seat carried by the free end of said spring.

CURT E. NYBERG.

REFERENCES CITED

The following references are of record in the file of this patent:

UNITED STATES PATENTS

| Number | Name | Date |
| --- | --- | --- |
| 64,432 | Limerick | May 7, 1867 |
| 1,530,405 | Perrine | Mar. 17, 1925 |
| 1,557,264 | Millen | Oct. 13, 1925 |
| 1,784,692 | Kline | Dec. 9, 1930 |
| 2,063,780 | Ball | Dec. 8, 1936 |
| 2,415,146 | Nanna | Feb. 4, 1947 |

FOREIGN PATENTS

| Number | Country | Date |
| --- | --- | --- |
| 502,622 | Great Britain | Mar. 22, 1939 |